US010287459B2

(12) United States Patent
Zhou et al.

(10) Patent No.: US 10,287,459 B2
(45) Date of Patent: May 14, 2019

(54) ADHESIVE PRINTABLE FILMS

(71) Applicant: Hewlett-Packard Development Company, L.P., Fort Collins, CO (US)

(72) Inventors: Xiaoqi Zhou, San Diego, CA (US); Francois K. Pirayesh, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/765,425

(22) PCT Filed: Dec. 15, 2015

(86) PCT No.: PCT/US2015/065809
§ 371 (c)(1),
(2) Date: Apr. 2, 2018

(87) PCT Pub. No.: WO2017/105409
PCT Pub. Date: Jun. 22, 2017

(65) Prior Publication Data

US 2018/0230338 A1 Aug. 16, 2018

(51) Int. Cl.
*C09J 7/29* (2018.01)
*B32B 27/08* (2006.01)
(Continued)

(52) U.S. Cl.
CPC *C09J 7/29* (2018.01); *B05D 1/28* (2013.01); *B05D 3/007* (2013.01); *B05D 3/144* (2013.01); *B05D 5/10* (2013.01); *B32B 27/08* (2013.01); *B32B 27/36* (2013.01); *C09J 7/383* (2018.01); *C09J 7/385* (2018.01); *C09J 11/08* (2013.01); *B41M 5/0047* (2013.01);
(Continued)

(58) Field of Classification Search
CPC .......................................................... C09J 7/29
See application file for complete search history.

(56) References Cited

U.S. PATENT DOCUMENTS 4,801,487 A 1/1989 Kalus et al.
5,458,983 A 10/1995 Wang et al.
(Continued)

FOREIGN PATENT DOCUMENTS

JP H11138977 5/1999
WO 2015069255 5/2015

OTHER PUBLICATIONS

International Search Report dated Nov. 8, 2016 for PCT/US2015/065809, Applicant Hewlett-Packard Development Company, L.P.

*Primary Examiner* — Betelhem Shewareged
(74) *Attorney, Agent, or Firm* — Thorpe North & Western LLP

(57) ABSTRACT

The present disclosure is drawn to an adhesive printable film. The film can include a polymeric film substrate, an image receiving layer, and an adhesive layer. The polymeric film substrate can have a first side and a second side, and can be transparent or translucent. The image receiving layer can be applied on the first side and can include a crosslinked polymeric network and polymeric particles dispersed therein. The peelable adhesive layer can be applied on the second side and can include a continuous matrix polymer having adhesive particles and plastic particles dispersed therein.

20 Claims, 3 Drawing Sheets

100
110
108
102
104
106
400

(51) Int. Cl.

| | |
|---|---|
| ***B32B 27/36*** | (2006.01) |
| ***C09J 7/38*** | (2018.01) |
| ***B05D 1/28*** | (2006.01) |
| ***B05D 3/00*** | (2006.01) |
| ***B05D 3/14*** | (2006.01) |
| ***B05D 5/10*** | (2006.01) |
| ***C09J 11/08*** | (2006.01) |
| *B41M 5/00* | (2006.01) |

(52) U.S. Cl.

CPC ...... *B41M 5/0064* (2013.01); *C09J 2205/102* (2013.01); *C09J 2205/106* (2013.01); *C09J 2205/114* (2013.01); *C09J 2407/00* (2013.01); *C09J 2421/00* (2013.01); *C09J 2423/04* (2013.01); *C09J 2423/10* (2013.01); *C09J 2423/106* (2013.01); *C09J 2427/00* (2013.01); *C09J 2433/00* (2013.01); *C09J 2463/00* (2013.01); *C09J 2463/006* (2013.01); *C09J 2467/00* (2013.01); *C09J 2475/00* (2013.01); *C09J 2475/006* (2013.01); *C09J 2491/00* (2013.01)

(56) References Cited

U.S. PATENT DOCUMENTS

| | | | |
|---|---|---|---|
| 5,639,539 A | | 6/1997 | DeProspero et al. |
| 5,676,787 A | | 10/1997 | Rusincovitch et al. |
| 5,866,220 A | | 2/1999 | Rusincovitch et al. |
| 6,194,064 B1 | | 2/2001 | Keely et al. |
| 6,226,909 B1 | | 5/2001 | Banning |
| 6,357,871 B1 | | 3/2002 | Ashida |
| 6,652,954 B2 | | 11/2003 | Nielsen et al. |
| 7,416,776 B2 | | 8/2008 | Emslander et al. |
| 7,521,173 B2 | | 4/2009 | Dontula et al. |
| 8,765,852 B1 | | 7/2014 | Swei et al. |
| 8,932,710 B2 | | 1/2015 | Inoue et al. |
| 8,988,634 B2 | | 3/2015 | Lee et al. |
| 2003/0170574 A1 | * | 9/2003 | Rieger .................. G03C 1/795 430/523 |
| 2005/0175818 A1 | | 8/2005 | Kawabata et al. |
| 2007/0245605 A1 | | 10/2007 | Hayes et al. |
| 2010/0055370 A1 | | 3/2010 | Diehl et al. |
| 2012/0236095 A1 | | 9/2012 | Pal et al. |
| 2014/0252330 A1 | | 9/2014 | Oh et al. |
| 2018/0230338 A1 | * | 8/2018 | Zhou ......................... C09J 7/29 |

* cited by examiner

ADHESIVE PRINTABLE FILMS

BACKGROUND

Inkjet printing has become a popular way of recording images on various media surfaces. Some of these reasons include low printer noise, variable content recording, capability of high speed recording, and multi-color recording. Additionally, these advantages can be obtained at a relatively low price to consumers. However, though there has been great improvement in inkjet printing, accompanying this improvement are increased demands in the area, e.g., higher speeds, higher resolution, full color image formation, new applications, etc. With new applications of use and new print substrates, there are often challenges presented that were not present with more traditional, paper-based, printing applications. Thus, there continues to be room for improvement as it relates to image quality and printing application versatility.

BRIEF DESCRIPTION OF THE DRAWINGS

Additional features and advantages of the disclosure will be apparent from the detailed description which follows, taken in conjunction with the accompanying drawings, which together illustrate, by way of example, features of the present technology. It should be understood that the figures are representative examples of the present technology and should not be considered as limiting the scope of the technology.

DETAILED DESCRIPTION

Figure 1:
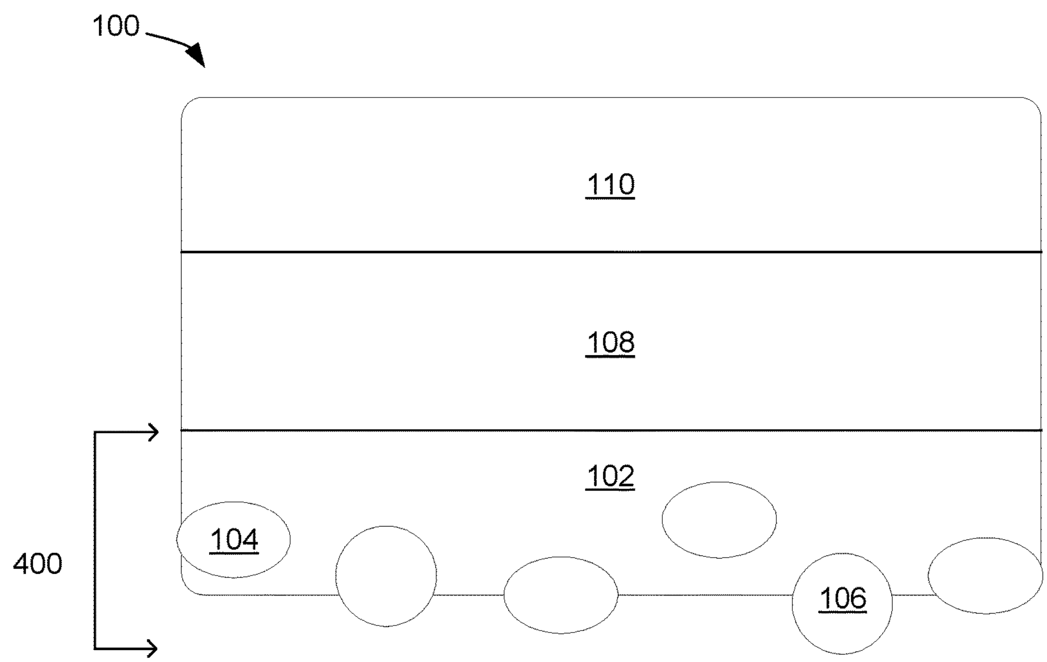
FIG. 1 is a cross sectional view of an example adhesive printable film in accordance with the examples of the present disclosure.

Specific applications for inkjet imaging can relate to the use of films as printing substrates, rather than the more traditional use of paper. Additionally, the ability for these films to be adherent to an underlying substrate, and even peelable (or re-peelable) therefrom provides a particularly useful application. For example, film based inkjet prints can be used to create display films, which can be used for various types of coverings, such as decorative coverings. Decorative coverings can include wall coverings, signs, banners, window films, windscreens, stickers, and the like with images in the form of designs, symbols, photographs, and/or text. When applied, these films can be subject to potential mechanical forces such as tearing and ripping, and/or environmental hazards such as contact with water and detergents. In addition, adhering display films to a variety of surfaces can be a challenge, and in some instances, providing peelable or re-peelable applications can be desirable.

The present disclosure is drawn to an adhesive printable film that, in many instances, the printed images can withstand mechanical action forces and/or environmental hazards, and the printed films can be easily adhered to a surface, peeled off from the surface, and re-adhered to the same surface or to another surface. For example, an adhesive printable film can include a polymeric film substrate, an image receiving layer, and a peelable adhesive layer. The polymeric film substrate can have a first side and a second side. The image receiving layer can include a crosslinked polymeric network and polymeric particles dispersed therein. This layer can be applied on the first side of the polymeric film substrate. The peelable adhesive layer can include a continuous matrix polymer, adhesive particles, and plastic particles. This layer can be applied to the second side of the polymeric film substrate.

In another example, a method of manufacturing an adhesive printable film is provided. The method can include providing a polymeric film substrate with a first side and a second side. The method can further include coating the first side of the polymeric film substrate with an image receiving layer and coating the second side of polymeric film substrate with a peelable adhesive layer. The image receiving layer can include a crosslinked polymeric network and polymeric particles dispersed therein. The peelable adhesive layer can include a continuous matrix polymer, an adhesive particle, and a plastic particle. Following the coating step the coatings can be dried to obtain an adhesive printable film. In other examples, the method can further include applying a corona treatment to the polymeric film substrate prior to applying any coatings.

In yet another example the present technology is drawn to system for printing on an adhesive printable film. The system can include an ink and an adhesive printable film. The adhesive printable film can include a polymeric film substrate, an image receiving layer, and a peelable adhesive layer. The polymeric film substrate can have a first side and a second side. The image receiving layer can include a crosslinked polymeric network with polymeric particles dispersed therein and can be applied on the first side of the polymeric film substrate. The peelable adhesive layer can include a continuous matrix polymer, adhesive particles, and plastic particles and can be applied on the second side of the polymeric film substrate.

Figure 2:
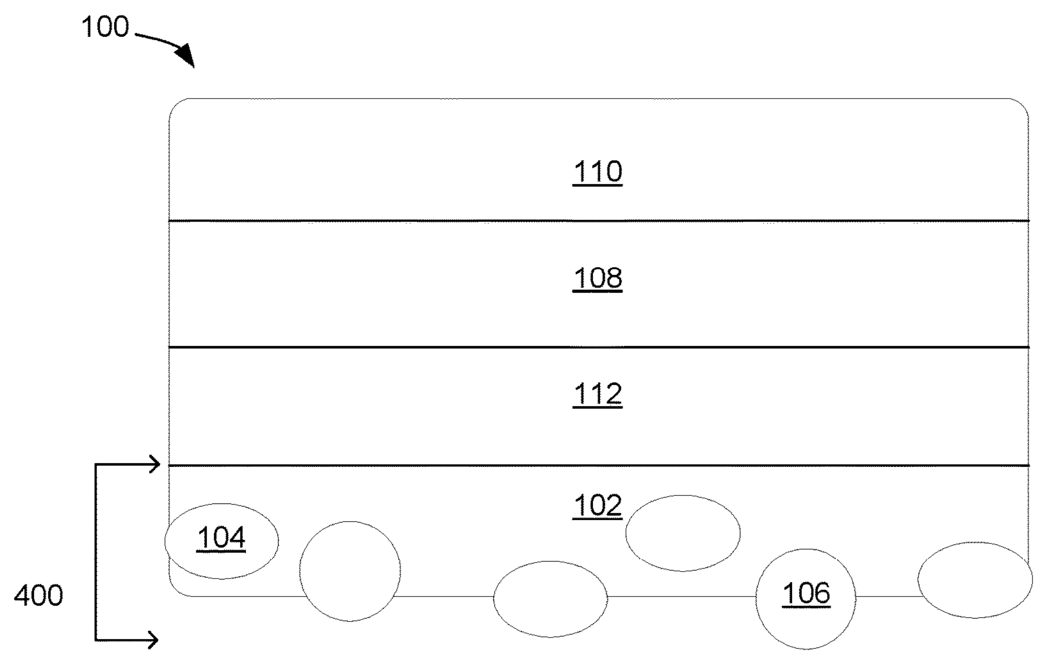
FIG. 2 is a cross sectional view of another example adhesive printable film in accordance with the examples of the present disclosure.
Figure 3:
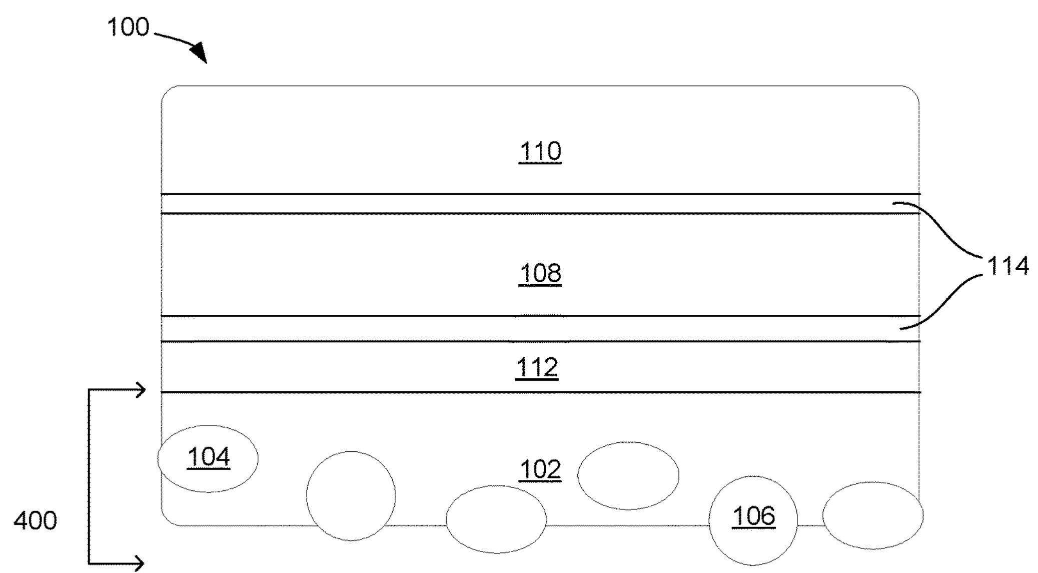
FIG. 3 is a cross sectional view of an additional example adhesive printable film in accordance with the examples of the present disclosure.

As shown in FIGS. 1, 2, and 3, the adhesive printable film 100 can include a polymeric film substrate 108, an image receiving layer 110, and a peelable adhesive layer 400.

Referring to the polymeric film substrate 108, the polymeric film substrate can be any synthetic polymeric film that can act as a substrate in accordance with examples of the present disclosure, e.g., transparent films, translucent films, etc. Regarding the polymer per se, these polymers in the film can have, for example, an average weight average molecular weight, Mw, greater than $1\times10^4$ grams per mole (g/mol), e.g., from about $2.9\times10^5$ g/mol to about $4.8\times10^5$ g/mol or from about $2.9\times10^5$ g/mol to about $3.95\times10^5$ g/mol.

The polymeric film substrate can be a homopolymer or a copolymer. Examples of such polymers include polyethylene, polypropylene, polyethylene terephthalate, polytetrafluoroehtylene, biaxially-oriented polyethylene terephthalate, polyamides, polystyrene, acrylonitrile butadiene styrene, vinyl chloride, polycarbonate, polyalkenes, or a combination thereof. In one example, the polymeric film substrate can be a polypropylene film. In a further example, the polymeric film can be polyethylene film. In yet another example, the polymeric film substrate can be a biaxially oriented polyethylene terephthalate. In some examples, the homopolymer or the copolymers of the polymeric film substrate can be modified by oxidation or by attaching functional groups to the polymer, e.g., modified by an amide, an amine, a maleic anhydride, an oxygen, or a polytetrafluoroethylene. Likewise, the polymer can be block, random, or graft, and/or can be uni-oriented or biaxially oriented.

In one example, the polymeric film substrate 108 can be between about 20 microns to about 300 microns. In another example, the thickness can be from about 40 microns to 200 microns. In yet another example, the thickness can be from about 20 microns to 100 microns. In a further example, the thickness can be from about 100 microns to about 300 microns.

The density of the polymeric film substrate 108 can also vary. In some examples, the density can range from about 0.50 grams per cubic centimeter (g/cm$^3$) to about 1.2 g/cm$^3$. In one example, the density can range from about 0.55 g/cm$^3$ to about 1.2 g/cm$^3$. In yet another example, the density ranges from about 0.75 g/cm$^3$ to about 1.5 g/cm$^3$. In a further example, the density ranges from about 0.25 g/cm$^3$ to about 1.75 g/cm$^3$.

The melting point of the polymeric film substrate can vary based on the composition of the substrate. However, in some examples, the melting point of the polymeric film substrate can range from about 125° C. to about 200° C. In another example, the melting point of the polymeric film substrate can range from about 140° C. to about 185° C. In yet another example, the polymeric film substrate can have a melting point ranging from about 150° C. to about 190° C.

In one specific example, the polymeric film substrate can be a synthetic polypropylene film having an average weight average molecular weight from about $2.9\times10^5$ g/mol to about $5.0\times10^5$ g/mol. The arrangement can be either uni-oriented or biaxially oriented. The average density can be about 0.85 g/cm$^3$ for the uni-oriented polypropylene and the average density for the biaxially oriented propylene can be about 0.94 g/cm$^3$.

In another example, the polymeric film substrate can be a synthetic polyester film. More specifically, the polyester polymers can be derived from an aromatic dicarboxylic acid and an alkylene glycol. Example aromatic dicarboxylic acids can include terephthalic acid, isophthalic acid, naphthalene-dicarboxylic acid, diphenyl dicarboxylic acid, diphenyl ether dicarboxylic acid, diphenylketone dicarboxylic acid, diphenylsulfone dicarboxylic acid, diphenylether dicarboxylic acid, α,β-bis(2-chlorophenoxy)ethane-4,4'-dicarboxylic acid anthracene-dicarboxylic acid, or the like. Example alkylene glycols can include ethylene glycol, trimethylene glycol, tetramethylene glycol, pentamethylene glycol, hexamethylene glycol, hexylene glycol, or the like. In one example, the synthetic polyester film can be a polyethylene terephthalate polymer derived from terephthalic acid and ethylene glycol.

Turning now to the image receiving layer 110, this layer can be a coating layer applied to a first side of the polymeric film substrate 108. The image receiving layer can be applied at a coat weight ranging from about 0.1 grams per square meter (gsm) to about 40 gsm. In other examples, the image receiving layer can be applied at a coat weight ranging from about 1 gsm to 20 gsm. In yet other examples, the image receiving layer can be applied at a coat weight from about 5 gsm to about 15 gsm.

The image receiving layer can include a crosslinked polymeric network and polymeric particle dispersed therein. The polymeric network can include one type of crosslinked polymer or a mixture of polymers. As used herein, a "polymeric network" refers to a polymer and/or a polymer mixture that is self-crosslinked or intra-crosslinked or inter-crosslinked by a reaction with another compound. In some examples, the crosslinking can occur by a reaction of functional groups in the same molecular chain, or the reaction can occur with functional groups on a different molecular chain.

The polymeric network can include epoxy, polyurethane, polyglycidyl resins, polyoxirane resins, polyester, polyacrylic, and combinations thereof. Exemplary polyurethanes can include polyether polyurethanes, polyester polyurethanes, and polycaprolactam polyurethanes. The polyurethanes can be aromatic or aliphatic.

In one example, the polymeric network includes self-crosslinked polyurethane polymer formed by reacting an isocyanate with a polyol. In another example, the isocyanates and polyols have on average less than three functional groups per molecule. In other examples, the isocyanates and polyols have on average more than three functional groups per molecule. In another example, the polyisocyanate can have at least two isocyanate functional groups per molecule and at least one of the isocyanate functional groups can be reactive with a polyol having at least two hydroxy groups or at least two amines.

The polyurethane polymers can have trimethyloxysiloxane functional groups. For example, the crosslinking can occur by hydrolysis of the functional groups to form a silsesquioxane structure. In yet another example, the polyurethane polymer can have acrylic functional groups. The crosslinking can occur by nucleophilic addition to the acrylate group through acetoacetoxy functionality. In yet another example, the polymeric network can be formed by a vinyl-urethane hybrid copolymer or an acrylic-urethane hybrid copolymer. In further examples, the polymeric network can include an aliphatic polyurethane-acrylic hybrid polymer.

The polymeric network can be formed by crosslinked polyglycidyl reins and/or a polyoxirane resins, for example. In some examples, the crosslinking can occur through catalytic homopolymerization of oxirane functional groups. In another example, the crosslinking can occur through the use of co-reactants including polyfunctional amines, acids, anhydrides, acid anhydrides, phenols, alcohols, and thiols.

Also, as mentioned, the polymeric network can include an epoxy resin. The expoxy resin can be a polyglycidyl resin or a polyoxirane resin and a polyurethane chain including functional groups selected from the group consisting of trimethyloxysiloxane, acrylic, or a combination thereof. When used in combination with a polyurethane chain, the polygycydyl resin or polyoxirane resin can be compatible with the polyurethane chain. An epoxy resin hardener can also be included when an epoxy resin is used in the polymeric network. The epoxy resin hardener can be a liquid aliphatic hardener or a cycloaliphatic amine hardener and can be 100% solids, dispersed in an emulsion, dispersed in water, or dispersed in a solvent solution. In one example, the hardener is an amine adduct with alcohols, phenols, an emulsifier, or a combination thereof. In some examples, the epoxy resin hardener can be a water based polyfunctional amine, acid, acid anhydride, phenol, alcohol, thiol, or a combination thereof.

Thus, there are a wide variety of crosslinked polymers that can be present in the image receiving layer. Notably, when being applied as a coating composition, these polymers may be in the form of a crosslinkable polymer that becomes crosslinked when applied and dried or cured on the polymeric film substrate. Thus, reference to "crosslinkable" polymer and "crosslinked" polymer can be used interchangeably herein, depending on the context.

Turning now to the polymeric particle in the image receiving layer, this particle can be a micronized polymeric solid powder. In some examples, the polymeric particle can be a poly-alkene polymeric compound, and in some examples, the polymeric particle can be dispersed in an aqueous solvent. Examples include anionic dispersed micronized high density polyethylene in a slurry, or anionic dispersed micronized high density polypropylene in a slurry.

The polymeric particle can have an average size from about 1 micrometer (μm) to about 30 μm. In some examples, the average particle size can range from about 1.5 μm to about 20 μm, or from about 5 μm to about 15 μm. The melting point of the polymeric particle can be greater than 100° C. In some examples, the melting point of the polymeric particle can be greater than 130° C. In other examples, the melting point of the polymeric particle can be greater than 150° C. A suitable melting point upper limit can be any melting point that is functional, but in one example, the upper limit can be about 135° C. to 150° C.

In additional examples, the polymeric particle can be formed of a chemically inert material with respect to the polymeric network (or polymeric binder if present). As used herein, "chemically inert" refers to materials which do not form any chemical bond or action with another material during mixing, coating application, and drying. In this respect, the polymeric particle does not alter the physical properties of the material it is dispersed within, but rather lies within the polymeric network. In some examples, the polymeric particles can function as a slip control mechanism which reduces mechanical friction with respect to the printed media surface.

In certain examples, the image receiving layer can further include (in addition to the crosslinked polymer described above), a polymeric binder that exhibits high binding power for the polymeric film substrate and for ink pigments. The polymeric binder can be a water soluble or a water dispersible binder, for example.

The water soluble binder can be a polymer, copolymer, starch, gelatin, or a combination thereof. Exemplary water soluble binders include, polyethylene oxide, polyethylene oxide-b-propylene oxide, polyacrylic acid, polystyrenesulfonic acid, polyvinyl alcohol, poly-4-vinylpyridine, poly-2-vinylpyridine, poly-N-vinylpyrrolidone, poly-2-ethyl-2-oxazoline, poly-1-glycerol methacrylate, polyacrylamide, polymethacrylamide, polybutadiene/maleic acid, polyallyl amine, poly-N-iso-propylacyrlamide, starch derivatives, dextrin, alkaline-modified starch, oxidized starch, phosphate monostarch, enzyme treated starch, acetylated starch, hydroxypropylated starch, hydroxyethyl starch, hydroxyethyl starch with ethylene oxide, cationic starch, carboxymethylated starch, cellulose derivatives such as carboxymethyl ether cellulose, ethyl ether cellulose, ethyl hydroxyethyl ether cellulose, methyl hydroxyethyl ether cellulose and chitosan, or gelatin.

The water dispersible binder can include styrene-butadiene emulsion, acrylonitrile-butadiene latex, acrylic emulsion, vinyl acetate emulsion, vinylidene chloride emulsion, polyester emulsion, polyurethane dispersion, acrylic-urethane hybrid polymer dispersion, epoxy based dispersed polymer, the like, and combinations thereof. The water dispersible binder can include a latex. Exemplary latexes can include copolymers of acrylic acid, methacrylic acid, acrylates, methacrylates, vinyl acetates, polyesters, styrene, butadiene, acrylonitrile, or combinations thereof. In one example the water dispersible binder can be a combination of butadiene and acrylonitrile.

The weight average molecular weight (Mw) of the polymeric binder can range from about 5,000 Mw to about 500,000 Mw, for example. In some examples, the weight average molecular weight can range from about 100,000 Mw to about 300,000 Mw. In other examples, the weight average molecular weight can range from about 150,000 Mw to about 250,000 Mw.

Tuning now to certain more specific examples of image receiving layers, in one example, the image receiving layer includes a polymeric network of a polyglycidyl resin or a poloxyirane resin, and a polyurethane chain including functional groups selected from the group consisting of trimethyloxysiloxane, acrylic, or a combination thereof. The polymeric particle can include an anionic dispersed micronized high density polyethylene slurry or an anionic dispersed micronized high density polypropylene slurry. The image receiving layer can be coated on the first side of the polymeric film substrate, and can thus be in condition for receiving an imaging ink, e.g., an inkjet ink. A polymeric binder, as described above, can also be included in some examples.

Figure 4:
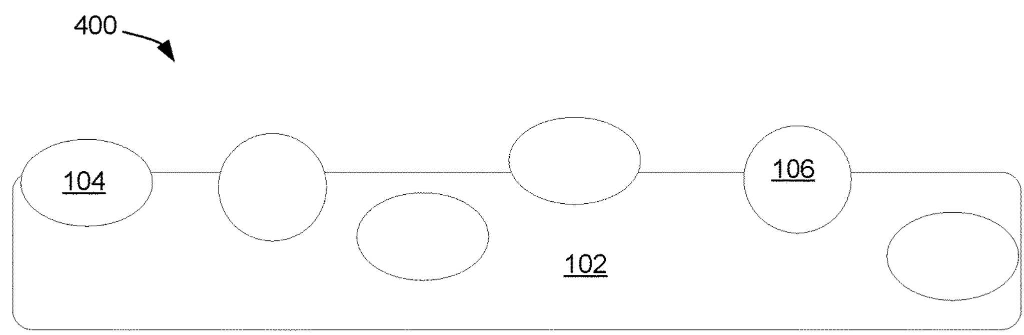
FIG. 4 is a cross sectional view of the peelable adhesive layer that can be applied to a film in accordance with the examples of the present disclosure.

Turning again to FIGS. 1-3 as well as FIG. 4, each of these FIGS. show a peelable adhesive layer 400. The peelable adhesive layer can include a continuous matrix polymer 102, an adhesive particle 104, and a plastic particle 106. In one example, the peelable adhesive layer can be applied to the second side of the polymeric film substrate (opposite side relative to the image receiving layer 110; See FIGS. 1-3). In another example, the peelable adhesive layer can be applied adjacent to a light intercepting layer 112 which is placed between the polymeric film substrate 108 and the peelable adhesive layer, as shown in FIGS. 2 and 3. However, unique to FIG. 3 in the examples shown, a pair of tie layers 114 are positioned on each side of the polymeric film substrate, which acts to provide additional adhesion between the polymeric film substrate and adjacent layers. Notably FIG. 3 shows a tie layer between the polymeric film substrate and the image receiving layer and a second tie layer between the polymeric film substrate and the light intercepting layer. That being said, a tie layer could likewise be found between the polymeric film substrate and the peelable adhesive layer (without a light intercepting layer), or between the light intercepting layer and the adhesive peelable layer, or on only one side of the polymeric film substrate.

The continuous matrix polymer 102 can be a soft and sticky matrix. In some examples, the continuous matrix polymer can include a polyacrylate polymer or a copolymer thereof. The continuous matrix polymer can include, for example, n-butyl acrylate, ethyl acrylate, 2-ethylhexyl acrylate, copolymers of these acrylates with other co-monomers, or combinations with homopolymers of co-monomers thereof. The co-monomers can be methyl methacrylates, t-butyl methacrylate, methyl acrylate, acrylic acid, styrene, natural rubber, synthetic thermoplastic elastomer, silicone rubber, rosins, terpenes, modified terpenes, aliphatic resins, cycloaliphatic resins, aromatic resins, hydrogenated hydrocarbon resins, terpene-phenol resins, derivatives, or combinations thereof. In some examples, the co-monomer can be an aliphatic and aromatic resins that has a 5 or a 9 chain carbon structure. In another example, the continuous matrix polymer can include 2-ethylhexyl acrylate. In a further example, the continuous matrix polymer can include ethyl acrylate. Further in another example, the continuous matrix polymer can be a copolymer of 2-ethylhexyl acrylate (98%) and acrylic acid (2%).

The characteristic of continuous matrix polymer, compared with the other polymers used in the adhesive coating is the particle size of the polymers. The average particle size of continuous matrix polymer can be in nano-order, ranging from about 50 nm to about 800 nm. In one example, the average particle size of continuous matrix polymer is 247 nm, and in another example, the average particle size of continuous matrix polymer is 502 nm. The polymer or combination of the polymers that include the continuous matrix polymer form a continuous film which holds an adhesive particle 104, and a plastic particle 106 within the peelable adhesive layer 400. The glass transition temperature of the continuous matrix polymer can range from about −100° C. to about −25° C. In one example, the glass transition temperature can range from about −75° C. to about −40° C. In another example, the glass transition temperature can range from about −50° C. to about −20° C.

With respect to the adhesive particle 104, the adhesive particle can be round, round-like, oval, oval-like, oblong, or oblong-like structure. One surface of these particles can thus serve as a contact point of the adhesive printable film. These particles render it possible for the film to be peeled, applied, re-peeled, and re-applied to a surface. Unlike the continuous matrix polymer 102, the adhesive particle 104 is formulated as a particle and is not formed as a continuous film layer or matrix. The ratio of particle size of the adhesive particle to that of continuous matrix polymer can be about 50:1 to about 100:1. The quantity of these particles dispersed in the continuous matrix polymer, the particle size, and softness of these particles (as represented by glass transition temperature) are factors that impact the ability of the film to be peeled, applied, re-peeled, and re-applied.

The adhesive particles thus include a different discrete structure compared to the continuous matrix polymer. However the list of possible polymeric chain structure materials for use as adhesive particles and in the continuous matrix polymer can be different in one example and can be similar in another example. What distinguishes each component from the other is the structure, especially particle size or form for which each is predesigned. The continuous matrix polymer, as the name implies, is a continuous matrix or field of polymer that is used to support various particles. The adhesive particles, on the other hand, retain their particulate shape and are randomly dispersed in the continuous polymer matrix.

The adhesive particles can include water dispersible polymers, latex particles, and combinations thereof. In one example, the adhesive particles can be included of acrylate polymers, n-butyl acrylate, ethyl acrylate, 2-ethylhexyl acrylate, copolymers of acrylates with co-monomers, or combinations thereof. The co-monomers can be a methyl methacrylate, t-butyl methacrylate, methyl acrylate, acrylic acid, styrene, natural rubber, synthetic thermoplastic elastomer, silicone rubber, or combinations thereof. In another example, the adhesive particles can include an acrylate polymer, a copolymer of an acrylate, a natural rubber, a synthetic rubber, or a combination thereof. In yet another example, the adhesive particles can include ethyl acrylate. Yet in another example, the adhesive particle is a copolymer of 2-ethylhexyl acrylate (87%), methyl methacrylate (7%), 2-hydroxyethyl acrylate (4%), and acrylic acid (2%). The adhesive particles can have a glass transition temperature ranging from about −100° C. to about −30° C. In another example, the glass transition temperature can range from about −80° C. to about −40° C. In yet another example, the glass transition temperature can range from about −70° C. to about −45° C.

The adhesive particles can have an average particle size ranging from about 10 μm to about 250 μm. In one example, the average particle size can be about 15 μm to about 200 μm. In yet another example, the average particle size can be about 20 μm to about 100 μm. In a further example, the average particle size can be about 25 μm to about 40 μm.

With respect to the plastic particles 106, these particles can serve as a functionalized spacer. The plastic particles maintain a channel for air flow which improves adhesion and contributes to the peelable nature of the film. The plastic particles can include an acrylic polymer or copolymer, a styrene polymer or copolymer, a methacrylate polymer or copolymer, a polyethylene or ethylene copolymer, a polypropylene or propylene copolymer, a polytetrafluoroethylene, a polyester or polyester copolymer, a fluorinated fatty acid, carnauba wax, paraffin wax, or a combination thereof. In one example, the plastic particles are a copolymer of styrene and acrylic. In another example, the plastic particles are a methacrylate polymer. Yet in another example, the plastic particles are a high density polyethylene particle.

The modules of the plastic particles can be higher than the modules of the adhesive particles. The modules of the plastic particle, as represented by a hardness value, can be about 2 dmm or less as measured by ASTM D-5 method. In some other examples, the plastic particles can have a hardness value 1 dmm or less. Yet in another example, the hardness value can be about 0.5 dmm. The average particle size of the plastic particles can be about the same as adhesive particles, or slightly smaller than adhesive particles, ranging from about 8 μm to about 200 μm. In another example, the plastic particles can have an average particle size that ranges from about 10 μm to about 30 μm. In general, the plastic particles can have an average particle size that is about 50% to 100% of the size of the adhesive particles. In one example, the plastic particles can on average about 30 μm, about the same size as the average size of the adhesive particles.

The plastic particles can have an average glass transition temperature that ranges from about 10° C. to about 80° C. In another example, the plastic particles can have an average glass transition temperature that ranges from about 25° C. to about 60° C.

As mentioned, the continuous matrix polymer 102 is admixed with adhesive particle 104 and the plastic particle 106 to form the peelable adhesive layer. The ratio of the continuous matrix polymer to the adhesive polymer can range from about 1:1 parts by weight to about 1:5 parts by weight. The plastic particles can be present at a weight ratio with respect to the continuous matrix polymer and the adhesive particles at a range from about 1:100 to about 5:100. In some examples, the glass transition temperature of the plastic particles can be greater than the glass transition temperature of the adhesive particles and the glass transition temperature of the adhesive particles can be comparable with the glass transition temperature of the continuous matrix polymer. In some examples, a protective release liner coated with silicone can be placed over the peelable adhesive layer, which protects the peelable adhesive layer until use.

In further detail regarding the tie layer(s) 114 shown in FIG. 3, this layer can formed of a polymeric material or a resin. Exemplary materials can include a polyacrylate, polymethacrylates, polyethyleneoxide, polyvinyl alcohol, polyethyleneterepthalate, polyamide, polycarbonate, polystyrene, polychloropene, polyoxyethylene, polystyrene, poly-2-vinyl pyridine, expoxy resins, and mixtures or combinations thereof. In some examples, the tie layer is a combination of two of these materials. In another example the tie layer is a combination of three or more of these materials.

The tie layer can have a surface free energy higher than the surface free energy of the polymeric film substrate. In one example, the surface free energy of the tie layer is greater than 30 milliNewtons per meter (mN/m) as measured at 20° C. In other examples, the surface free energy of the tie layer is >35 mN/m, >38 mN/m, or >40 mN/m as measured at 20° C.

When applied, the tie layer can be applied at different weights. In one example, the tie layer can be applied at a weight range from about 0.01 grams per square meter (gsm) to about 5 gsm. In another example, the tie layer can be applied at a weight range from about 0.1 gsm to about 3 gsm. In yet another example, the tie layer can be applied at a weight range from about 0.5 gsm to about 4 gsm. In addition, the thickness of the tie layer can vary based on the application. In some examples the thickness ranges from about 0.01 μm to about 5 μm. In another example, the thickness ranges from about 0.2 μm to about 0.5 μm. In a further example, the thickness ranges from 0.5 μm to about 3 μm.

In further detail regarding the light intercepting layer 112 shown in FIGS. 2 and 3, this layer can be placed between the image receiving layer 110 and the polymeric film substrate 108 or between the polymeric film substrate and the peelable adhesive layer 400. In some examples, a tie layer can be placed between the light intercepting layer and the polymeric film substrate, as shown.

The light intercepting layer can include a dispersing agent and two types of inorganic particles, a first particle and a second particle. The dispersing agent of the light intercepting layer can be included of phosphates, polyphosphates, carboxylates, oleic acid, polycarboxylates, acrylates, methacrylates, hydrolysable alkoxysilanes with an alkoxy group attached to the water soluble moiety, or silane coupling agents with hydrophilic functional groups. Exemplary silane coupling agents can include aminoethyl aminopropyl-triethoxysilane, aminopropyl-trimethoxysilane, aminoethyl aminopropyl-methyldimethoxysilane, aminopropyl-triethoxysilane, aminopropyl-trimethoxysilane, glycidolpropyl-trimethoxysilane, ureidopropyltrimethoxysilane, polyether triethoxysilane, polyether trimethoxysilane hydrolysis products of aminopropyl-trimethoxysilane, or hydrolysis products of aminoethyl minopropyl-trimethoxysilane. Exemplary hydrophilic functional groups can include amino, diamino, triamino, ureido, poly(ether), mercapto, glycidol functional groups, and their hydrolosis products. Other organosilane coupling agents, that are not explicitly disclosed herein, can also be used. For example, the particles can be surface modified. The surface modification can include coupling the first and/or second particles physically, chemically, or physically and chemically to an organic compound.

The first particles can include metal oxides or complex metal oxides. Exemplary first particles include rutile, brookite, anatase titanium dioxide, titanium dioxide, or combinations thereof. Other exemplary first particles include aluminum oxide, aluminum phosphate, nanocrystaline boehmite alumina, beryllium oxide, dysprosium oxide hafnium(IV) oxide, lutetium oxide, scandium oxide, tantalum pentoxide, tellurium dioxide, titanium dioxide, zinc oxide, zirconium dioxide, barium titanate, calcium molybdate, calcium tungstate, gallium arsenide oxide, gallium antimonide, oxide potassium niobate, potassium tantalate, potassium titanyl phosphate, lithium iodate, lithium niobate, silicone dioxide, strontium titanate, yttrium aluminum garnet, yttrium vanadate, or combinations thereof.

In some examples, the first particle can have light scattering effects, meaning that the particles can change the direction of light. This occurs whenever the first particles have a different refractive index than the other components in the layer. In one example, the first particle can have a refractive index of equal to or greater than 1.8. In another example, the refractive index of the first particles can be equal to or greater than 2.

The median first particle size can range, as defined by distribution 50 ($D_{50}$), from about 500 nanometers (nm) to about 600 nm. In one example, the median particle size range can be from about 400 nm to about 800 nm. In yet another example, the median particle size range can be from about 390 nm to about 750 nm.

Exemplary second particles can include calcium carbonate, zeolite, silica, talc, alumina, aluminum trihydrate, calcium silicate, kaolin, calcined clay, and mixtures or combinations thereof. In another example, the second particles can include calcium carbonate or a mixture of calcium carbonate. The calcium carbonate can be ground, precipitated, modified ground, or modified precipitated. Yet, in another example, the second particle can be a silica powder The size of the second particles can be about 1.5 to about 3 times larger than the first particles. In one example, the median particle size as defined by $D_{50}$, can be about 750 nm to about 900 nm. In another example, the median particle size can be from about 1.5 μm to about 1.8 μm. In yet another example, the median particle size can range from about 600 nm to about 1.2 μm. In a further example, the median particle size can range from about 1.2 μm to about 2.4 μm. In other examples, the median particle size can range from about 585 nm to about 1.125 μm or from about 1.170 μm to about 2.250 μm. The refractive index of the second particles can have a delta from about 0.4 to about 1.8.

The ratio of the second particle to the first particle can vary. In one example, the weight ratio of the second particle to the first particle can range from about 15:1 to about 300:1.

In some examples, the light intercepting layer can further include a water soluble binder. When included, the water soluble binder can be any of the water soluble polymeric binder described herein for use in other layers. In one example, the water soluble binder can be present at a weight ratio relative to the second particle ranging from about 5 dry parts to 100 parts, or from about 30 dry parts to 100 parts.

The light intercepting layer affects the transparency of the adhesive printable film. When excluded, the adhesive printable film can be transparent. When included, the composition and coating thickness of the light intercepting layer causes the adhesive printable film to be translucent or even opaque. The opacity of the adhesive printable film can range from about 1% (very translucent) to about 100% (completely opaque) and anywhere there between 1% and 100%.

Figure 5:
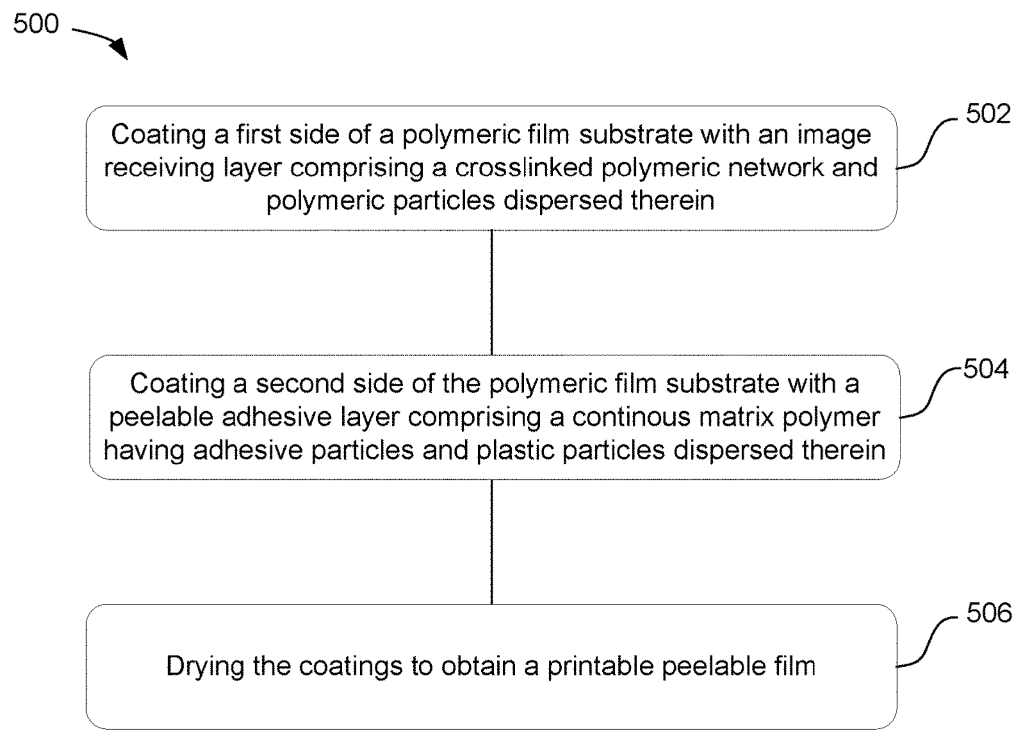
FIG. 5 is a flow chart of a method for manufacturing an adhesive printable film in accordance with the examples of the present disclosure.

In another example, a method for manufacturing 500 an adhesive printable film is shown in FIG. 5. The method can include coating 502 the first side of the polymeric film substrate with an image receiving layer; coating 504 the second side of the polymeric film substrate with a peelable adhesive layer; and drying 506 the coatings to obtain the adhesive printable film. In some methods, before the coating (of one or both sides) occurs, the polymeric film substrate can be corona treated. The corona treatment is can provide better adhesion between the polymeric film substrate and the adjacent layer. In other examples, additional layers, such as tie layer(s) and/or a light intercepting layer, can be coated on the polymeric film substrate or between various layers as designed.

The coatings can be applied using a variety of methods. For example, the coatings can be applied using a conventional off-line coater, a rod coater, a gate-roll meter, blade meter, Meyer rod metering, or slot metering. In some examples, the drying process can include different drying zones with different types of dryers, such as, infrared dyers, hot surface rollers, and/or hot air floatation boxes.

Further presented is a system for printing on an adhesive printable film. The system can include an ink and an adhesive printable film. The ink can be an inkjet ink. The adhesive printable film can include a polymeric film substrate with a first side and a second side, an image receiving layer coated on the first side, and a peelable adhesive layer coated on the second side. The image receiving layer can include a polymeric network and a polymeric particle. The peelable adhesive layer can include a continuous matrix polymer, adhesive particles, and plastic particles. In some examples, the adhesive printable film can further include tie layer(s) and/or a light intercepting layer.

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein "$D_{50}$" particle size is determined using a Malvern® Zetasizer® Nano (Malvern Instruments™, Malvern, Worcestershire UK) when a sample is diluted at 1:1,000 ratio in triethyleneglycol divnyl ether. Particle size distribution $D_{50}$ is also known as the median diameter or the medium value of the particle size distribution. It is value of the particle diameter at 50% in the cumulative distribution. For example, if $D_{50}$ is 600 nm, then half of the particles samples are larger than 600 nm and the other half of the particles are smaller than 600 nm. $D_{50}$ is used herein to represent the median particle size of a group of particles.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of about 1 wt % to about 20 wt % should be interpreted to include not only the explicitly recited limits of about 1 wt % and about 20 wt %, but also to include individual weights such as 2 wt %, 11 wt %, 14 wt %, and sub-ranges such as 10 wt % to 20 wt %, 5 wt % to 15 wt %, etc.

As used herein, "printable film" or "adhesive printable film" refers to a film which can be printed on with ink on a first, image receiving side, as well as adhered/peeled from a surface using a peelable adhesive layer coated on a second, opposite side.

EXAMPLES

The following examples illustrate the technology of the present disclosure. However, it is to be understood that the following is only exemplary or illustrative of the application of the principles of the presented formulations and methods. Numerous modifications and alternative methods may be devised by those skilled in the art without departing from the spirit and scope of the present disclosure. The appended claims are intended to cover such modifications and arrangements. Thus, while the technology has been described above with particularity, the following provide further detail in connection with what are presently deemed to be the acceptable examples.

Examples 1-3

Polypropylene film bases with an average thickness of 0.2 mm and a first and second side were prepared. The film bases were then treated on both sides with a corona treatment. The corona treatment was applied using roll form electrodes at room temperature. Following the corona treatment, a copolymer emulsion of a butyl acrylate-ethyl acrylate was applied as a tie layer. The tie layer was applied to the film at an average thickness from about 1.5 μm to 2.3 μm on both sides of the film. An image receiving layer was then applied to the first side of each of the polypropylene films. The image receiving layer was formulated by mixing the dry ingredients from Table 1 in deionized water. The image receiving layer was then coated onto each of the polypropylene films using a lab rod coater.

TABLE 1

Image Receiving Layer

| Ingredient* | Class | Parts by Dry Weight |
|---|---|---|
| Araldite ® PZ 3291 | Polymeric Network - resin | 11 |
| Aradur ® 3985 | Polymeric Network - resin crosslinker | 14 |
| Printrite ® DP376 | Polymeric binder | 8 |
| Slip-AYD ® SL 177 | Polymeric Particle Slurry - Polyethylene Wax | 11 |
| Tego ® wet 510 | Surfactant | 3 |

*Araldite ® PZ 3921 and Aradur ® 3985 are available from Huntsman ® Advanced Materials, Inc.; Printrite ® DP376 is available from Lubrizol ® Corporation; Slip-AYD ® SL 77 is available from Elementis ® Specialties Inc.; and Tego ® wet 510 is available from Evonik ® Resource Efficiency GmbH.

The peelable adhesive layer was applied at a coat weight of 15-20 gsm using a lab blade coater. The formulation for the peelable adhesive layer was as shown in the formulation list on Table 2 to generate transparent printing media, Examples 1-3.

TABLE 2

Peelable Adhesive Layers

| Ingredient* | Class | Ex. 1 | Ex. 2 (comparative) | Ex. 3 (comparative) |
|---|---|---|---|---|
| | | Parts by dry Weight | | |
| Rhoplex ® N-1031 | Continuous Matrix Polymer 1 | 32 | 58 | 32 |
| Rhoplex ® N-619 | Continuous Matrix Polymer 2 | 8 | 16 | 9 |
| Micronax 243-01 | Adhesive Particles | 54 | 0 | 54 |
| Slip-AYD ® SL 300 | Plastic Particles | 1 | 1 | 0 |

TABLE 2-continued

Peelable Adhesive Layers

| Ingredient* | Class | Ex. 1 | Ex. 2 (comparative) | Ex. 3 (comparative) |
|---|---|---|---|---|
| | | Parts by dry Weight | | |
| Tego ® wet 510 | Surfactant | 2 | 2 | 2 |
| Water | | 70 | 74 | 70 |

*Rhoplex ® N-1031 and Rhoplex ® N-619 are available from Dow ® Chemical Corporation; Micronax 243-01 is available from Franklin International; Slip-AYD ® SL 300 is available from Elementis ® Specialties Inc.; and Tego ® wet 510 is available from Evonik ® Resource Efficiency GmbH.

Examples 4-6

Polypropylene film bases with an average thickness of 0.2 mm and a first and second side were prepared. The film bases were then treated on both sides with a corona treatment. The corona treatment was applied using roll form electrodes at room temperature. Following the corona treatment, a copolymer emulsion of a butyl acrylate-ethyl acrylate was applied as a tie layer. The tie layer was applied to the film at an average thickness from about 1.5 μm to 2.3 μm on both sides of the film. An image receiving layer was then applied to the first side of each of the polypropylene films. The image receiving layer was formulated by mixing the dry ingredients from Table 1 in deionized water. The image receiving layer was then coated onto each of the polypropylene films using a lab rod coater.

The propylene films were then further coated in another processing pass with a light intercepting layer. The light intercepting layer was applied at a coat weight of 5.0 gsm to 8.0 gsm to the second side of the polymeric film substrate (the opposite side relative to the image receiving layer) by a lab rod coater. The composition of the light intercepting layer is provided in Table 3. In this example, the first particles ($Ti_4$—$O_x$-$0_2$-P) and the second particles (Hydrocarb® 95 HS) were surface treated with gamma-aminopropyltriethoxy silane.

TABLE 3

Light Intercepting Layer

| Ingredient* | Class | Parts Dry Weight |
|---|---|---|
| | Particles | |
| $Ti_4$—$O_x$-$0_2$-P | Inorganic Particles-Titanium Dioxide | 5 |
| Hydrocarb ® 95 HS | Inorganic Particles-Calcium Carbonate | 95 |
| | Dispersant | |
| Acronal ® 886 | Polymeric Binder-Styrene Acrylic Copolymer | 18 |
| BYK ® 024 | Deformer | 1 |
| Tego ® wet 510 | Surfactant | 0.5 |
| Irgalite ® violet (Dye 1) | Dye | 0.007 |
| Irgalite ® blue (Dye2) | Dye | 0.003 |

*$Ti_4$—$O_x$-$0_2$-P is available from American Elements ®; Hydrocarb ® 95 HS is available from Omya ®; Acronal ® 866, Irgalite ® violet, and Irgalite ® blue are available from BASF ® Corp.; BYK ® 024 is available from BYK ® Additives & Instruments; and Tego ® wet 510 is available from Evonik ® Resource Efficiency GmbH.

After finishing the light intercepting layer, a peelable adhesive layer was further applied on top of light intercepting layer. The peelable adhesive layer was applied at a coat weight of 15 gsm to 20 gsm using a lab blade coater. The peelable adhesive layer was formulated using the formulation in Table 4 to generate transparent printing media, Examples 4-6.

TABLE 4

Peelable Adhesive Layers

| Ingredient* | Class | Ex. 4 | Ex. 5 (comparative) | Ex. 6 (comparative) |
|---|---|---|---|---|
| | | Parts by dry Weight | | |
| Rhoplex ® N-1031 | Continuous Matrix Polymer 1 | 32 | 58 | 32 |
| Rhoplex ® N-619 | Continuous Matrix Polymer 2 | 8 | 16 | 9 |
| Micronax 243-01 | Adhesive Particles | 54 | 0 | 54 |
| Slip-AYD ® SL 300 | Plastic Particles | 1 | 1 | 0 |
| Tego ® wet 510 | Surfactant | 2 | 2 | 2 |
| Water | | 70 | 74 | 70 |

*Rhoplex ® N-1031 and Rhoplex ® N-619 are available from Dow ® Chemical Corporation; Micronax 243-01 is available from Franklin International; Slip-AYD ® SL 300 is available from Elementis ® Specialties Inc.; and Tego ® wet 510 is available from Evonik ® Resource Efficiency GmbH.

Example 7

The adhesive printable films of Examples 1-6 and a commercial backlit film media were evaluated and their performance was also evaluated. The results of the test are summarized in Table 5 (image quality and durability) and Table 6 (adhesion). More specifically, they were evaluated by printing images using a large format, thermal latex inkjet printer HP® L350 with a 6-ink color system: cyan, magenta, yellow, black, light cyan, and light magenta. Each of the inks was a pigmented aqueous latex based ink. The print mode was a 230% ink load 16-pass, bidirectional, in native color mode (no color rendering), and the heater zone was at set points of 50° C. and 110° C.

For each type of media, reflective and transmissive gamut were determined. Specifically, the reflective gamut was determined by a Spectrolino™ spectrophotometer (available from GretagMacbeth, Switzerland) with illumination type of $D_{50}$ and observer angle of 2°. The transmissive gamut was determined by Barbieri® spectrophotometer (available from Barbieri® Electronics OHG, Italy) with illumination type of $D_{50}$ and observer angle of 2°

Each sample was also examined visually by multiple inspectors under a controlled light box with $D_{65}$ fluorescent lighting following an established procedure, i.e. ISO 10526: 1999/CIE S005/E-1998. Apart from generating numeric data, like optical density and gamut, the inspectors looked specifically for overall image quality and gave each of the samples a simple rating from 1 (poor image quality) to 5 (good image quality).

Durability was also tested in terms of ink transfer and anti-scratch ability using Taber® 5700 Linear Abraser (available from Taber® Industries, New York). Ink transfer was evaluated by determining the ink amount transferred to a test cloth on top of a test tip loaded with 800 g weight for 5 cycles. Anti-scratch ability was evaluated by a coin scratching test method using the same machine. The coin was set at a 75° angle and the loading force was incrementally increased from 130 g, to 300 g, to 550 g, and to 800 g.

The light diffusion ability was evaluated by mounting the test media onto a standard LED lighting box without a diffusion panel. The results were determined by observing light distribution across the full lighting box panel.

The data for these tests is provided in Table 5, as follows:

TABLE 5

| Image quality and durability results | | | |
|---|---|---|---|
| | Example 1-3 (transparent film) | Example 4-6 (translucent film) | Commercial backlit film (translucent) |
| Transmissive gamut | 720,000 | 680,000 | 538,00 |
| Reflective gamut | 520,000 | 557,000 | 485,000 |
| Average Total image quality (5 inspectors) | 4.5 | 4.5 | 4 |
| Ink Transfer (on printed surface) | 4.8 | 5.0 | 3 |
| Anti-coin scratch (on printed surface) | 4.8 | 4.8 | 2 |
| Light uniformity | NA | 5 | 5 |

Gamut values measured using Spectrolino ™ spectrophotometer as outline above; Other values were averaged from scores given from multiple observers (Score 1: Poor, Score 5: Best)

All of the test films were then separately tested for adhesion performance on a painted metal surface, a wood surface, a rough wall surface, and a glass window surface. On a scale from 1 to 5, a score of 5 indicates best performance and a score of 1 indicates unsatisfactory very poor performance. Plus and minus indicators were included for borderline performance between each score value. The test results for each of the peelable adhesive layer compositions is shown in Tables 6A and 6B below. The results were the same for the transparent and translucent films having the same peelable adhesive layer composition. Commercial backlit film media has no back adhesive and therefore is not included into this test.

TABLE 6A

| Peeling Performance | | | | |
|---|---|---|---|---|
| | Surface | | | |
| | Painted Metal | | Wood Surface | |
| Sample | Adhesion Strength | Re-peeling & Re-positioning | Adhesion Strength | Re-peeling & Re-positioning |
| Exp. 1 | 5 | 5 | 5 | 4+ |
| Exp. 2 | 5 | 2 | 5− | 3 |
| Exp. 3 | 5 | 3+ | 5 | 5 |

TABLE 6B

| Peeling Performance | | | | |
|---|---|---|---|---|
| | Surface | | | |
| | Rough Wall Surface | | Glass Window Surface | |
| Sample | Adhesion Strength | Re-peeling & Re-positioning | Adhesion Strength | Re-peeling & Re-positioning |
| Exp. 1 | 4 | 4+ | 4 | 4+ |
| Exp. 2 | 3− | 4 | 5− | 3 |
| Exp. 3 | 4 | 4+ | 4 | 2 |

average scores from multiple observers (Score 1: Poor, Score 5: Best)

The printable and peelable media with adhesive layer compositions disclosed in this invention preformed well on all of the tested surfaces for initial adhesion strength. The same compositions also performed well for re-peeling and re-positioning. Example 2 demonstrated an issue on re-peeling and re-positioning due to lack of large particle adhesive component; while, example 3 demonstrated weakness on re-peeling from extremely smooth surfaces like window glass.

While the present technology has been described with reference to certain examples, those skilled in the art will appreciate that various modifications, changes, omissions, and substitutions can be made without departing from the spirit of the disclosure. It is intended, therefore, that the disclosure be limited only by the scope of the following claims.

What is claimed is:

1. An adhesive printable film, comprising:

a polymeric film substrate with a first side and a second side, wherein the polymeric film substrate is transparent or translucent;

an image receiving layer comprising a crosslinked polymeric network and polymeric particles dispersed therein, said image receiving layer applied on the first side of the polymeric film substrate; and a peelable adhesive layer comprising a continuous matrix polymer having adhesive particles and plastic particles dispersed therein, wherein the adhesive particles have an average particle size from about 10 μm to about 250 μm and the plastic particles have an average particle size ranging from about 8 μm to about 200 μm, said peelable adhesive layer applied on the second side of the polymeric film substrate.

2. The adhesive printable film of claim 1, wherein the polymeric film substrate comprises polyethylene, polypropylene, polyethylene terephthalate, polytetrafluoroethylene, biaxially-oriented polyethylene terephthalate, polyamide, polystyrene, acrylonitrile butadiene styrene, vinyl chloride, polycarbonate, polyalkenes, or a combination thereof.

3. The adhesive printable film of claim 1, wherein the crosslinked polymeric network comprises epoxy, polyurethane, or combination thereof.

4. The adhesive printable film of claim 1, wherein the crosslinked polymeric network comprises a polyglycidyl resin or a polyoxirane resin and a polyurethane chain including functional groups selected from trimethyloxysiloxane, acrylic, or combination thereof.

5. The adhesive printable film of claim 1, wherein the polymeric particles comprise an anionic dispersed micronized high density polyethylene slurry or an anionic dispersed micronized high density polypropylene slurry.

6. The adhesive printable film of claim 1, wherein the crosslinked polymeric network further comprises a water soluble or water dispersible polymeric binder.

7. The adhesive printable film of claim 1, wherein the adhesive particles comprises an acrylate polymer, a copolymer of an acrylate, a natural rubber, a synthetic rubber, or a combination thereof.

8. The adhesive printable film of claim 1, wherein the plastic particles comprises an acrylic polymer or copolymer, a styrene polymer or copolymer, a methacrylate polymer or copolymer, a polyethylene or ethylene copolymer, a polypropylene or propylene copolymer, a polytetrafluoroethylene, a polyester or polyester copolymer, a fluorinated fatty acid, a carnauba wax, a paraffin wax, or a combination thereof.

9. The adhesive printable film of claim 1, wherein a weight ratio of the continuous matrix polymer to the adhesive particles ranges from about 1:1 to 1:5, and wherein the plastic particles are present at a weight ratio with respect to the adhesive particles and the continuous matrix polymer from about 1:100 to about 5:100.

10. The adhesive printable film of claim 1, further comprising a translucent or opaque light intercepting layer positioned between the polymeric film substrate and the peelable adhesive layer.

11. The adhesive printable film of claim 1, further comprising one or two tie layers positioned immediately adjacent to the polymeric film substrate.

12. A method of manufacturing an adhesive printable film, comprising:

coating a first side of a polymeric film substrate with an image receiving layer comprising a crosslinked polymeric network and polymeric particles dispersed therein, wherein the polymeric film substrate is transparent or translucent;

coating a second side of the polymeric film substrate with a peelable adhesive layer comprising a continuous matrix polymer having adhesive particles and plastic particles dispersed therein, wherein the adhesive particles have an average particle size from about 10 μm to about 250 μm and the plastic particles have an average particle size ranging from about 8 μm to about 200 μm; and drying the coatings to obtain the adhesive printable film.

13. The method of claim 12, further comprising applying a corona treatment to one or both sides of the polymeric film substrate prior to coating the first side, the second side, or both.

14. A system for printing on an adhesive printable film, comprising:

an ink; and an adhesive printable film, comprising:

a polymeric film substrate with a first side and a second side, wherein the polymeric film substrate is transparent or translucent, an image receiving layer comprising a crosslinked polymeric network and polymeric particles dispersed therein, said image receiving layer applied on the first side of the polymeric film substrate, and a peelable adhesive layer comprising a continuous matrix polymer having adhesive particles and plastic particles dispersed therein, said peelable adhesive layer applied on the second side of the polymeric film substrate, wherein the adhesive particles have an average particle size from about 10 μm to about 250 μm and the plastic particles have an average particle size ranging from about 8 μm to about 200 μm.

15. An adhesive printable film, comprising:

a polymeric film substrate with a first side and a second side, wherein the polymeric film substrate is transparent or translucent;

an image receiving layer comprising a crosslinked polymeric network and polymeric particles dispersed therein, said image receiving layer applied on the first side of the polymeric film substrate; and a peelable adhesive layer comprising a continuous matrix polymer having adhesive particles and plastic particles dispersed therein, said peelable adhesive layer applied on the second side of the polymeric film substrate, wherein a weight ratio of the continuous matrix polymer to the adhesive particles ranges from about 1:1 to 1:5, and wherein the plastic particles are present at a weight ratio with respect to the adhesive particles and the continuous matrix polymer from about 1:100 to about 5:100.

16. The adhesive printable film of claim 15, wherein the polymeric film substrate comprises polyethylene, polypropylene, polyethylene terephthalate, polytetrafluoroethylene, biaxially-oriented polyethylene terephthalate, polyamide, polystyrene, acrylonitrile butadiene styrene, vinyl chloride, polycarbonate, polyalkenes, or a combination thereof.

17. The adhesive printable film of claim 15, wherein the crosslinked polymeric network comprises epoxy, polyurethane, or combination thereof.

18. The adhesive printable film of claim 15, wherein the adhesive particles comprises an acrylate polymer, a copolymer of an acrylate, a natural rubber, a synthetic rubber, or a combination thereof; or wherein the plastic particles comprises an acrylic polymer or copolymer, a styrene polymer or copolymer, a methacrylate polymer or copolymer, a polyethylene or ethylene copolymer, a polypropylene or propylene copolymer, a polytetrafluoroethylene, a polyester or polyester copolymer, a fluorinated fatty acid, a carnauba wax, a paraffin wax, or a combination thereof; or both.

19. The adhesive printable film of claim 15, further comprising a translucent or opaque light intercepting layer positioned between the polymeric film substrate and the peelable adhesive layer.

20. An adhesive printable film, comprising:

a polymeric film substrate with a first side and a second side, wherein the polymeric film substrate is transparent or translucent;

an image receiving layer comprising a crosslinked polymeric network and polymeric particles dispersed therein, said image receiving layer applied on the first side of the polymeric film substrate;

wherein:

the crosslinked polymeric network comprises a polyglycidyl resin or a polyoxirane resin and a polyurethane chain including functional groups selected from trimethyloxysiloxane, acrylic, or combination thereof, the polymeric particles comprise an anionic dispersed micronized high density polyethylene slurry or an anionic dispersed micronized high density polypropylene slurry, or both; and a peelable adhesive layer comprising a continuous matrix polymer having adhesive particles and plastic particles dispersed therein, said peelable adhesive layer applied on the second side of the polymeric film substrate.

* * * * *